Feb. 24, 1942. C. F. RAUEN 2,274,460
MUFFLER
Filed Oct. 14, 1937 2 Sheets-Sheet 1

INVENTOR.
CARL F. RAUEN

Patented Feb. 24, 1942

2,274,460

UNITED STATES PATENT OFFICE 2,274,460

MUFFLER

Carl F. Rauen, Grosse Pointe, Mich.

Application October 14, 1937, Serial No. 168,945

45 Claims. (Cl. 181—59)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to mufflers for silencing the exhaust of internal combustion engines, the intake of air compressors and the like.

Heretofore, exhaust noises have been silenced primarily by restricting the flow of the gases by means of several baffles. These baffles are usually either in series so that the gas passes directly from one to the other, or so arranged that the gases reverse their flow after passing through each baffle. These methods of silencing cause a high degree of back pressure. Since back pressure is detrimental to the operation of an internal combustion engine, it is desirable to eliminate it or reduce it to a very low degree.

With my designs I can muffle the exhaust gases from internal combustion engines, with little or no back pressure, and with mufflers relatively smaller than those now in use.

A primary object, therefore, of this invention is to separate the sound energy from the exhaust gas stream, with little or no restriction on the flow of the gas stream; that is, to separate the sound from the gas stream by directing it to one place until its energy is destroyed, while the gas stream is allowed to escape at another place.

To obtain this control of the sound and gas, I make use of what I term sound trap chambers, which will be hereinafter more fully explained, and the reflecting and focusing properties of the conic sections, and other shapes, to reflect, focus, concentrate and destroy sound; I also make use of the sound absorbing and destroying properties of such materials as steel wool, mineral wool, asbestos, etc., which are so arranged in the muffler that the sound is absorbed or destroyed by entering the interstices of the material, where it travels devious and tortuous paths, while the exhaust gas stream is led through the muffler with little or none of it passing through this absorbing material. A further property of the above material is its comparative softness; that is, it does not reflect sound like hard material.

It is a well known fact that sound can be reflected and focused substantially in the same manner as light, by means of reflectors, and hence I make use of the reflecting and focusing properties of reflectors shaped to the conic sections; that is, the parabolic, hyperbolic, elliptical, or spherical reflectors, or any combination of the above, to control the sound energy and produce silencing by reflecting, focusing, or concentrating the sound at one place by means of the foregoing methods, either separately or in any combination, until its energy is destroyed, while the gas stream is allowed to escape from another place.

Use is also made of the reflecting properties of flat plates and inclined surfaces or, for that matter, any shape of inclosure wherein the sound can be trapped and caused to lose its energy by rapid reflection between the walls of said enclosure, into which it has been introduced, while the gas stream is led to atmosphere by a separate path, minus the greater part of the sound energy.

Since sound can be focused or concentrated by various types of reflectors, I have designed and built mufflers wherein the exhaust sound is concentrated or trapped by one or more reflectors, or sound traps, while the gas is permitted to escape at a place where the least amount of sound can escape with it.

Due to the high efficiency of the methods of silencing used in my invention, very little restriction need be put on the flow of the gas stream, in order to confine the sound to the muffler until it is destroyed, and in consequence of this high silencing efficiency, a much smaller and cheaper muffler can be made to do the work of the larger ones now in use.

It is understood that any hard surface will reflect sound, regardless of its shape, in a manner complying with the well known laws of reflection, and that soft surfaces absorb sound. It is further understood that every time sound is reflected, it loses some of its energy. The muffler designs shown in this application preferably are made of sheet metal stampings which are fastened together as by welding. They can, however, be made of castings.

It is another object of this invention to provide baffles to break up the sound waves and produce silencing without the gas stream flowing through them and with little effect on the flow of the gas stream, as well as to cause these baffles to act more than once on the sound, that is, to cause their ability to destroy sound to be brought into play at least twice.

A still further object is to provide a muffler of the straight-through type, wherein the gas stream flows directly and in substantially a straight line through the muffling unit on its way to atmosphere.

A further object of this invention is to provide a muffler with relatively small chambers, so that the sound energy will be destroyed in a very short time within said chambers.

A still further object of this invention is to prevent the recombining of the sound wave fronts after being broken up by baffles.

The chamber referred to herein as a "sound trap chamber" is a substantially closed chamber, having communication with the gas passageway of a muffler and so arranged that little or none of the exhaust gas passes through said chamber on its way to atmosphere, said communication forming an acoustic coupling between said gas passageway and said chamber and opening abruptly into said sound trap chamber, the area of said communication being substantially less than the cross sectional area of said chamber, whereby the sound, after passing through said communication into said chamber, expands, as is its natural tendency, and is destroyed by reflection or otherwise, and little or none of said sound returns to said passageway, due to the restriction offered by said communication.

The expressions, side-branch chamber, dead chamber, sound attenuating chamber, and acoustic chamber are used herein synonymously with the term "sound trap chamber."

This application is a continuation in part of my prior application, Serial No. 427,312, filed February 10, 1930 for Muffler, now Patent No. 2,138,510, granted November 29, 1938.

With the foregoing and other objects in view, as will hereinafter appear, my invention consists of certain novel features of construction, combinations and arrangements of parts, as will be hereinafter described in detail and particularly set forth in the appended claims.

For a better understanding of the invention, reference may be had to the accompanying drawings, of which there are two sheets and wherein.

Figure 1:
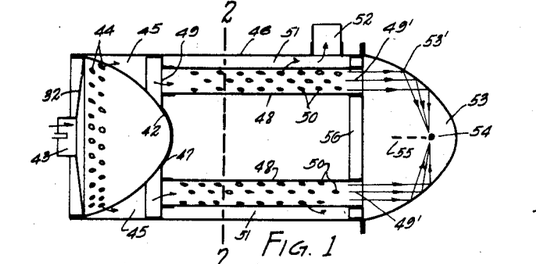
Fig. 1 is a longitudinal cross sectional view of one embodiment of my invention.
Figure 2:
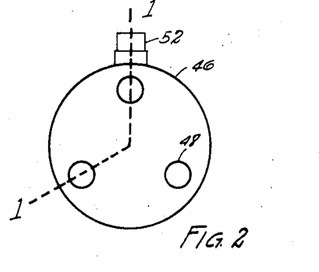
Fig. 2 is a section on the line 2—2 of Fig. 1.

The muffler illustrated in Fig. 1 is provided with a reflector 42 opposite the exhaust gas stream inlet opening 43. The reflector 42 is preferably of parabolic shape. The gas stream enters the muffler inlet 43, and after impinging upon the reflector 42, passes through the holes 44 to the chamber 45 formed by the body 46, the reflector 42 and the plate 47. It will be noted that the holes 44 are disposed adjacent the periphery of the reflector 42.

Some of the sound waves, after impinging on the reflector 42, are reflected and concentrated at the focus point of the reflector, while the exhaust gas stream flows out the holes 44, which are in a relatively quiet zone. In order to have most of the sound energy concentrated at the focus point of the reflector, it is necessary to prevent as much of it as possible from scattering—that is, expanding in the form of a sphere, as it tends to do as it passes from the end of the exhaust pipe to the reflector—so that the sound energy strikes the reflector in lines parallel to the axis. Therefore, the end of the exhaust pipe should protrude in the muffler through the opening 43 to a point where a maximum of silencing is obtained with a minimum of restriction to the flow of the exhaust gas stream. This location can best be determined experimentally. That part of the sound energy which escapes with the exhaust gas stream through the holes 44 passes into the tubes 48.

The plate 47 supports preferably two or more, preferably equally spaced tubes 48, which are in communication with the chambers 45 and 53 by means of the openings 49 and 49'. The gas, after passing through the holes 44 into the chamber 45, enters the tubes 48 through the openings 49, and then passes through the holes 50 in the tubes 48 to the chamber 51 and thence to atmosphere through the outlet 52. Any sound that escapes out the holes 44 in the reflector 42, enters the tubes 48 and travels down them into the chamber 53 formed by the plate 56 and the reflector 53' and impinges on the parabolic reflector 53'. It is then reflected to the focus point 54 where it meets similar reflected sound from the other tube or tubes 48. All sound not destroyed by the first reflection is reflected back and forth within the chamber 53 until it is destroyed; except what sound may possibly be reflected back into the tubes 48.

Inasmuch as only sound waves parallel to the axis 55, will be reflected to the main focus point 54, and as some of the sound is almost sure to scatter, this scattered sound will be reflected to form a line of foci on the axis 55.

The reflector 53' and the plate 56 form a sort of "sound trap" from which little or no sound escapes after entering, due to the smallness of the holes 49' compared to the cross sectional area of the sound trap chamber 53. I have determined this by actual experiment on automobiles. This sound trap chamber has no openings other than those for the tubes 48. It is possible to even omit the front reflector 42 and get very good results.

It will be noted that the exhaust gas stream on its passage to atmosphere does not flow through the sound trap chamber formed by the reflector 53' and the plate 56, and therefore the objectionable sound waves are trapped and destroyed after separation from the exhaust gas stream and without impeding the flow thereof.

There is practically no escape of sound out the holes 50 in the tubes 48 and whatever does escape is broken up by the holes 50, so as not to be noticeable. The back pressure of these mufflers is very low due to the absence of a large number of baffles and restrictions to the flow of the exhaust gas stream. Hence, the number of perforations for a given back pressure is materially less than in conventional designs, with the result that there is less possibility for the sound energy to escape with the exhaust gas stream. Furthermore, these perforations can be spaced further apart and thereby prevent the sound waves that do escape with the exhaust gas stream from recombining before passing to atmosphere.

The operation of the reflector 53' is somewhat different than that of the reflector 42, in that the gas does not flow against it or through the chamber 53, and that the sound is brought into it in preferably two or more parallel streams. If the reflector 53' was a cone instead of a parabola, the sound would not be reflected to a focus point as there is none in a cone, but it would obey the ordinary laws of reflection, and the sound energy from one of the tubes 48 would be reflected to impinge on the reflected sound energy from the other tube 48, assuming that the axis of the cone was on the center line of the muffler. If the cone has an included angle of 90 degrees, the sound energy from the tubes 48 will be reflected so as to abut directly against each other, whereas if the angle of the cone is something other than 90 degrees the sound energy from the tubes 48 will meet on an angle. Any sound not destroyed on the first reflection within the chamber 53, or any that scattered, will be reflected back and forth within the chamber 53 until its energy is destroyed; if the tubes 48 make an angle with the centerline of the muffler, the reflected sound will meet on an angle and will be reflected within the chamber 53 until its energy is destroyed much in the same manner as sound is reflected from one wall to another, or to the ceiling and floor of a building until it dies out, but in case of the muffler, the time required for the sound energy to be destroyed is only a very small fraction of a second, instead of several seconds as in the case of an auditorium. The reason for this is that, since, sound loses energy every time it is reflected, it will be reflected many more times per second in the small chamber 53 than it will be in an auditorium and, therefore, die out quicker.

If only one tube 48 is used, the sound passing into the chamber 53 is reflected back and forth within the chamber until it is destroyed, obeying the well known laws of reflection. The tubes 48 can extend into the chamber 53 varying amounts, depending on the size of the said chamber.

Figure 3:
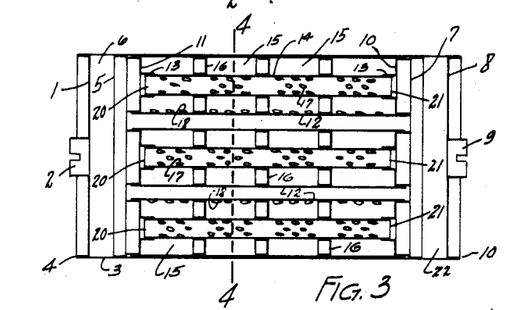
Fig. 3 is a further embodiment of my invention.
Figure 4:
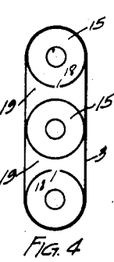
Fig. 4 is a cross sectional view of Fig. 3 taken on the line 4—4 of Fig. 3, Figs. 5, 6, 7, 8, 9, 10 and 11 are optional arrangements of Fig. 4.
Figure 5:
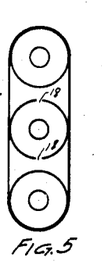
Figure 6:
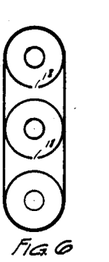
Figure 7:
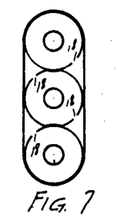
Figure 8:
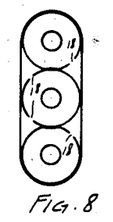
Figure 9:
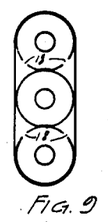
Figure 10:
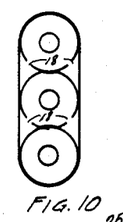
Figure 11:
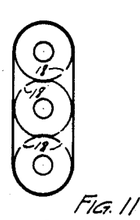

The muffler shown in Fig. 3 has a header 1 provided with an opening 2 for attachment to the exhaust pipe of an engine and is welded in the body 3 at 4. A further header 5 is disposed within the body 3 and welded thereto and it together with the plate 1 form an expansion chamber 6. A similar header 7 is disposed at the rear end of the muffler and a header 8 provided with an opening 9 for the attachment of a tail pipe is disposed and welded into the rear end of the muffler at 10. The headers 5 and 7 are provided with dowl portions 11 which form supports for the tubes 12. The headers 5 and 7 are also provided with cylindrical openings 13 for supporting tubes or conduits 14, which tubes 14 are provided with small perforations or louvred openings 17 communicating with the sound trap chambers 15 formed by the partition plates 16 disposed within the tubes 12. The sound trap chambers 15 can be of equal size or varied in size and are acoustically coupled to the tubes 14 through the openings 17. The tubes 12 are also provided with perforations or louvred openings 18 to acoustically couple the chambers 15 to the chambers 19 formed between the tubes 12 and the body 3 as shown in Figs. 4 to 11 inclusive. However, in some cases a satisfactory muffler can be produced without providing any openings 18 in the tubes 12.

The operation of this muffler is as follows: Exhaust gas from the engine enters the expansion chamber 6 and passes through the tubes 14 at 20 which tubes are disposed and preferably of parallel plane and emerges at 21 into the chamber 22 formed by the body 3 and the headers 7 and 8, it then passes out the opening 9 into the til pipe while the exhaust noise passes through the openings 17 in the tubes 14 and into the sound trap chambers 15 where it is destroyed by reflection within said chambers. If the tubes 12 are provided with openings such as 18, some sound will pass into the chambers 19 and be destroyed by reflection within said chambers. If any of the sound after passing into the chambers 15 and 19 passes back through the openings 17 and 18, it will be further broken up by said openings and it will be seen that these openings act on the sound twice to break it up and destroy it, the first time being when the sound passed from the tubes 14 into the samples 15.

There is a distinct advantage in employing a plurality of small tubes having a sum total cross sectional area substantially equal to the inlet area 2 as the number and the size of the sound trap chambers 15 can be greatly reduced and still provide a high degree of silencing as it has been determined by experiment that the larger the tubes 14 the greater the number of sound trap chambers 15 is required to provide equivalent silencing. In other words it is better and cheaper to provide a plurality of tubes or conduits 14 of small diameter than to use one large tube of equivalent area as a smaller and cheaper muffler can be made in that manner. I have found by experiment that the sound trap chambers 15 and 19 can be of various shapes without effecting the silencing characteristics of the muffler. The sound energy after entering the sound traps destroys itself within the sound traps and very little, if any, of said sound energy which passes into the sound traps escapes therefrom, due to the fact that the sound energy after passing into the sound traps, expands, and the communication between the sound traps and the tubes through which the exhaust gas flows is relatively restricted.

Figure 12:
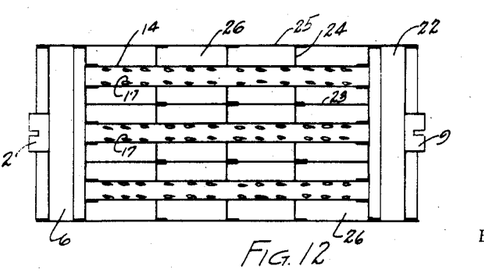
Fig. 12 is a modification of Fig. 3.
Figure 13:
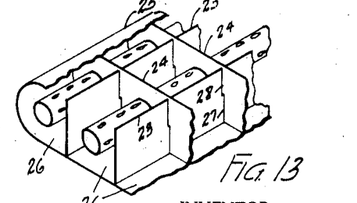
Fig. 13 is an isometric view of the inside of Fig. 12.

Fig. 12 is a modified form of the muffler shown in Fig. 3 and it does not have sound trap chambers equivalent to the chambers 19 of Fig. 3. It differs further therefrom in that the plates 23 and 24 form together with the body 25 sound trap chambers 26. The plates 23 and 24 are slotted at intervals along their length as shown at 27 and 28 of Fig. 13 and are telescopically assembled as shown. These plates are preferably spot welded on the top and bottom where they cross each other.

The operation of this muffler is as follows: The gas enters the inlet opening 2 and expands in the chamber 6, it then passes in parallel streams down the tubes 14 into the chamber 22 and thence to atmosphere through outlet 9 while the sound energy passes through the openings 17 into the sound trap chambers 26 and 25 where it is destroyed by reflection within said chambers.

Figures 14, 15:
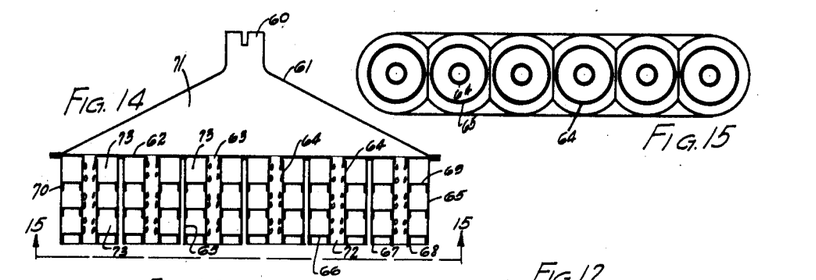
Fig. 14 is a still further modification of Fig. 3.
Fig. 15 is a view on the line 15—15 of Fig. 14.

Fig. 14 is a further modification of Fig. 3 and is particularly adapted for trucks where a tail pipe is not used or for installation at the rear end of a passenger car. An opening 60 is provided in the manifold 61 for attachment to the exhaust pipe of the engine. A plate 62 is provided with openings 63 communicating with the tubes 64. Surrounding the tubes 64 are cylindrical members 65 which are preferably welded or otherwise secured to the plate 62. In the end of the cylinder 65 are headers 66 which are preferably welded to the cylinder 65 at 67 and to the tubes 64 at 68. Disposed at intervals along the tubes 64 are partition plates 69 which are welded or pressed on to the tube 64 and are adapted to be welded or otherwise secured to the cylinders 65 at 70.

The operation of this design is as follows: The gas enters the manifold chamber 71 through the inlet opening 60 and passes into the tubes 64 and thence to atmosphere through the end openings 72 in the tubes 64 while the sound energy enters the sound trap chambers 73 where it is destroyed by reflection therein.

This type of design due to the large number of tubes 64 can be relatively flat and therefore is particularly adapted for use at the rear end of an automobile where there is a minimum amount of room due to having to provide the necessary road clearance.

Figures 16, 17, 18, 19, 20, 21, 22:
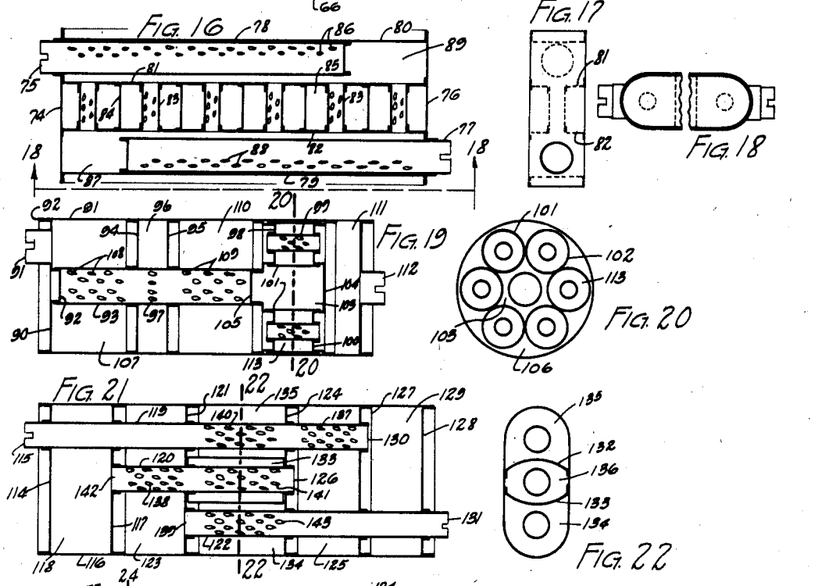
Fig. 16 is a modification of Fig. 14.
Fig. 17 is an end view of Fig. 16.
Fig. 18 is a partially broken away view on the line 18—18 of Fig. 16.
Fig. 19 is a still further modification embodying my invention.
Fig. 20 is a view on the line 20—20 of Fig. 19.
Fig. 21 is a still further modification embodying my invention.
Fig. 22 is a view on the line 22—22 of Fig. 21.

Fig. 16 is a modification of Fig. 14 wherein there is a header 74 provided with an opening through which extends a perforated tube 75 adapted to be connected to the exhaust pipe of an engine. At the other end of the muffler is a similar header 76 which is also provided with an opening through which extends the perforated tube 77. The perforated parts of the tubes 75 and 77 can in some cases be dispensed with, the main purpose being to provide some baffles and also to distribute the gas along the inside of the muffler. The perforations are preferably disposed adjacent the sides 78 and 79 of the body 80. Disposed within the body are plates 81 and 82 which are provided with openings to support the perforated tubes 83. Between the tubes 83 are disposed partitions 84 to form together with the plates 81 and 82 sound trap chambers 85.

This type of muffler is also relatively flat and is so designed that it can be used amidships of a motor vehicle and has provisions for connecting the tube 77 to a tail pipe and its operation is as follows: The exhaust gas from the engine passes down the tube 75 and thence through the openings 86 whereupon it divides and passes around the tube 75 and into the plurality of tubes 83 and from said tubes 83 into the chamber 87 and enters the tube 77 through the openings 88 which are also disposed to one side of said tube 77. If the perforated parts of the tubes 75 and 77 are dispensed with, then the gas on entering the tube 75 passes into the chamber 89 directly and then through the tubes 83 and into the chamber 87 and thence to atmosphere through the tube 77 while the sound energy in either case is destroyed by the sound trap chambers 85. The sound trap chambers 85 can be divided so as to form two chambers by inserting transverse partitions such as the partition 69 of Fig. 14. However, it has been found by experiment that a sound trap chamber at the outlet end of a perforated tube is extremely effective in attenuating sound.

In Fig. 19 there is a header 90 provided with an opening 91 for attachment to the exhaust pipe of an engine, said header 90 being welded in the body 91 at 92. The header 90 is also provided with a dowl portion 92 for supporting one end of the tube 93. Disposed along the tube 93 are partition plates 94 and 95 which, together with the body 91 form a sound trap chamber 96. The sound trap chamber 96 is in communication with the interior of the tube 93 by means of the openings 97. The rear end of the tube 93 is supported on an opened dowl portion formed on the header 98, which header is welded to the body 91 and is provided with holes to support one end of the tubes 99, the other end of said tubes 99 being supported by a similar header 100. The headers 98 and 100 have disposed between them cylinders 101 which surround the tubes 99. These cylinders are arranged as shown in Fig. 20 and tangentially touch each other at 102 whereby to form a sound trap chamber 103 which is closed at one end by the headers 100 at 104 and is opened to the tube 93 at the other end 105. Further sound trap chambers 106 are formed by the body surrounding the cylinders 101, which can be used, if necessary, as a sound trap by providing openings in the cylinders 101 communicating with the sound trap chambers 106. The operation of this muffler is as follows: The gas enters the opening 91 and expands in an expansion chamber 107, then enters the tube 93 through the perforations 108 and passes along said tube 93 and out the perforations 109 into the expansion chamber 110, it then passes down the tubes 99 into the chamber 111 and from thence to atmosphere through the outlet opening 112. The perforated portion 108 of the tube 93 can be dispensed with if desired, as well as the expansion chamber 107, in which case the exhaust pipe from the engine would connect direct to the tube 93. The sound trap chamber 96 is adapted to trap and attenuate the sound as it is in communication with the tube 93 by means of the holes 97. The sound traps 113 will also trap and attenuate sound passing down the tubes 109 so that the exhaust gas escapes to atmosphere minus all or nearly all of the noise.

In Fig. 21 a header 114 is provided with an opening 115 for attachment to the exhaust pipe of the engine and is welded into the body 116. A further header 117 is also preferably welded to the body and it and the header 114 together with the body 116 form a sound trap chamber 118. The header 117 is provided with an opening through which passes the tube 119 and in the opening and support for the tube 120, said opening being in communication with the sound trap chamber 118. Another header 121 is disposed and welded within the body and has flanged cylindrical openings snugly fitting the tubes 119, 120 and 122, the tube 122 being open to the expansion chamber 123. The header 124 also has openings for supporting the tubes 119, 120 and 122, the tube 120 being in communication with the expansion chamber 125 at 126. The header 127 supports the rear end of the tube 119 and also the tube 122 and it, together with the rear header 128 and the body 116 forms a sound trap chamber 129 in communication with tube 119 at 130. The end 131 of the tube 122 is adapted to be coupled to the tail pipe of a motor vehicle. Plates 132 and 133 are disposed between the headers 121, 124 and body 116 so as to form sound trap chambers 134, 135 and 136.

The operation of this muffler is as follows: The exhaust gas from the engine enters the tube 119 at 115 and passes out the openings 137 and the rear end thereof into the expansion chamber 125, it then enters the tube 120 at 126 and passes out the openings 138 into the expansion chamber 123, and then enters the tube 122 at 139 and passes out the end 131 thereof to atmosphere.

Some of the sound energy on its way from the inlet to the outlet passes through the openings 140 into the sound trap chamber 135 where it is trapped and destroyed by reflection within said chamber. Other portions of the sound energy pass through the opening 130 in the end of the tube 119 into the sound trap chamber 129 where it is trapped and destroyed by reflection. The sound trap chamber 133 traps a further amount of the sound energy which passes into it through the openings 141 and any of the sound energy that enters into the sound trap chamber 118 at 142 is also trapped and destroyed. The sound trap 134 traps further sound energy from the exhaust stream which energy enters the trap 134 through the holes 143. If desired, the sound trap chamber 129 can be eliminated.

Figure 23:
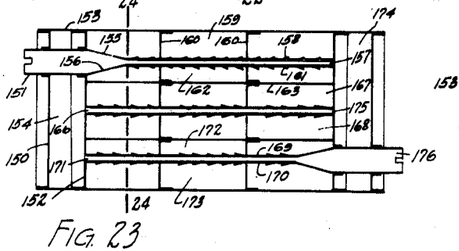
Fig. 23 is a modification of Fig. 21.
Figure 24:
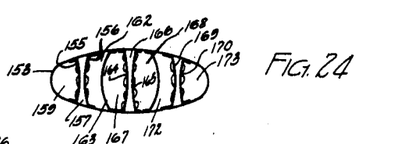
Fig. 24 is a view on the line 24—24 of Fig. 23.

In Fig. 23 there is a header 150 supporting a tube 151 which is adapted to be coupled to the exhaust pipe of the engine. A further header 152 is disposed adjacent the header 150 and within the body 153 to form an expansion trap chamber 154. The tube 151 has a snug fit in the header 152 and communicates with plates 155 and 156 which are arranged to form a gas passage-way 157. The plate 155 is provided with louvres 158 in communication with the sound trap chamber 159, formed by the body 153 and the partition plates 160. The plate 156 is also provided with louvres 161 in communication with the sound trap chamber 162 formed by the body 153, the plates 160 and the plate 163.

The plates 164 and 165 form a gas passage-way 166. The plate 164 is also provided with louvres in communication with the sound trap chamber 167. The plate 165 is provided with louvres in communication with the sound trap chamber 168. Plates 169 and 170 are similar to plates 155 and 156 and form a gas passage-way 171 in communication with the sound trap chambers 172 and 173.

The operation of this muffler is as follows: The exhaust gas enters the tube 151 and passes along the passage-way 157 to the expansion chamber 174, it then enters the passage-way 166 at 175 and passes to the left into the expansion chamber 154, and it then enters the passage-way 171 and passes to atmosphere at 176 while the sound is extracted by the sound trap chambers 159, 162, 167, 168, 172 and 173.

Subject matter disclosed but not claimed herein is claimed in my issued Patents Nos. 2,138,510 and 2,229,672 and in my co-pending applications Serial Nos. 168,944 and 168,946 filed October 14, 1937.

What I claim and desire to secure by Letters Patent is:

1. An acoustic silencer for sound entrained gases of an internal combustion engine comprising a casing provided with an inlet port and an outlet port for said gases, a plurality of parallel tubes disposed within said casing and forming at least a part of the path traversed by said gases from said inlet to said outlet ports and means defining a sound attenuating chamber acoustically coupled to said tubes.

2. An acoustic silencer for sound entrained gases of an internal combustion engine comprising a casing provided with an inlet port and an outlet port for said gases, a plurality of tubes disposed within said casing and forming at least a part of the path traversed by said gases from said inlet to said outlet ports and means defining a sound attenuating chamber acoustically coupled to said tubes.

3. An acoustic silencer for sound entrained gases of an internal combustion engine comprising a casing provided with an inlet port and an outlet port for said gases, a plurality of parallel tubes disposed within said casing and forming at least a part of the path traversed by said gases from said inlet to said outlet ports and means defining a sound attenuating chamber acoustically coupled to said tubes, said sound attenuating chamber being abruptly enlarged adjacent said coupling.

4. An acoustic silencer for sound entrained gases of an internal combustion engine comprising a casing provided with an inlet port and an outlet port for said gases, a tube disposed within and to one side of said casing and forming at least a part of the path through which said gas flows on its way from said inlet to said outlet port, and means defining a sound attenuating chamber acoustically coupled to said tube.

5. An acoustic silencer for sound entrained gases of an internal combustion engine comprising a casing provided with an inlet port and an outlet port for said gases, a tube disposed within and to one side of said casing through which said gas flows on its way from said inlet to said outlet port, and means defining a sound attenuating chamber acoustically coupled to said tube, said sound attenuating chamber being abruptly enlarged adjacent said coupling.

6. An acoustic silencer for sound entrained gases of an internal combustion engine comprising a casing provided with an inlet port and an outlet port for said gases, said ports being out of alignment, a plurality of parallel tubes disposed within said casing and forming at least a part of the path traversed by said gases from said inlet to said outlet ports, and means defining a sound attenuating chamber acoustically coupled to said tubes.

7. An acoustic silencer having at one end thereof a closed sound attenuating acoustic chamber, a tube opening abruptly into said chamber, said opening being to one side of the longitudinal axis of said chamber.

8. An acoustic silencer comprising a casing, a header at each end thereof, a transverse partition within said casing and located between said headers, said partition and one of said headers forming at least part of an acoustic sound attenuating chamber, a tube eccentrically disposed within said casing and having one end thereof opening into said chamber, said chamber being abruptly enlarged adjacent said opening.

9. An acoustic silencer comprising a casing, a header at each end thereof, a transverse partition within said casing and located between said headers, said partition and one of said headers forming at least part of an acoustic sound attenuating chamber, a tube eccentrically disposed within said casing and having one end thereof opening into said chamber.

10. A silencer for exhaust gases comprising a muffling unit through which the exhaust gas stream flows on its way to atmosphere and having provision at one end thereof for connection to the exhaust pipe of an engine, said muffling unit having in combination a tube within and to one side of said unit and through which sound entrained gas flows, said tube being provided with an exhaust gas inlet opening at one end thereof, an outlet opening in the walls thereof, said outlet opening comprising a series of relatively small openings extending axially of said tube, and a further outlet opening at the other end thereof, one of said outlet openings constituting an exhaust gas outlet having communication with atmosphere, the other outlet opening constituting a sound energy outlet, means providing a sound trap chamber, said chamber being acoustically coupled to said sound energy outlet in such a way as not to form part of the path traversed by the major portion of said gas on its flow through said unit, and having a cross-sectional area substantially greater than that of said sound energy outlet immediately adjacent said outlet.

11. A silencer for sound entrained flowing gases comprising a muffling unit through which the gas stream flows, said muffling unit having in combination a casing having an inlet opening and an outlet opening, a tube provided with perforations in the walls thereof and arranged within and to one side of said casing, means, including said tube, forming a passageway within said casing for the flow of gas between said inlet and outlet openings, and means defining a sound trap chamber within said casing, said chamber being acoustically coupled to said passageway in such a manner as not to form part of the path traversed by the major portion of the gas on its flow through said casing.

12. A silencer for sound entrained flowing gases comprising a muffling unit through which the gas stream flows, said muffling unit having in combination a casing having an inlet opening and an outlet opening, a plurality of tubes, each tube being open at one end and being provided with openings in the walls thereof, means, including said tubes, forming a passageway within said casing for the flow of gas between said inlet and outlet openings, and means defining a sound trap chamber within said casing, said chamber being acoustically coupled to said passageway in such a manner as not to form part of the path traversed by the major portion of the gas on its flow through said casing.

13. An acoustic silencer for sound entrained flowing gases comprising a casing having means providing a main gas conducting channel therein, a transverse partition defining a sound trap chamber within said casing, the outer periphery of said chamber being defined by said casing, a plurality of tubes, each tube being open at one end and being provided with an open area in the walls thereof, said tubes being arranged within said casing and forming part of said gas conducting channel, said chamber being acoustically coupled to said channel in such a manner so that little or none of the gas passes through said chamber on its flow through said casing.

14. An acoustic silencer for sound entrained flowing gases comprising a casing having means providing a main gas conducting channel therein, partition means arranged transversely of said casing and cooperating therewith to divide the space within said casing into two chambers, the outer periphery of one of said chambers being defined by said casing, a plurality of tubes, at least one of which is perforated, arranged parallel to the axis of said casing and extending through one of said chambers, each of said tubes being open at one end, said tubes forming part of said gas conducting channel, one of said chambers comprising a sound trap for attenuating the sound energy entrained in said flowing gases, said sound trap chamber being acoustically coupled to said channel in such a manner as not to form part of the path traversed by the major portion of the gas on its flow through said casing.

15. An acoustic silencer for sound entrained flowing gases comprising a casing having means providing a main gas conducting channel therein, a part of said channel including an expansion chamber having a cross-sectional area substantially equal to the cross-sectional of said casing, partition means arranged transversely of said casing and cooperating therewith to define a sound trap chamber, the outer periphery of said sound trap chamber being defined by said casing, a perforated tube arranged parallel with and to one side of the axis of said casing and extending through one of said chambers, said tube forming part of said gas conducting channel, said sound trap chamber being acoustically coupled to said channel in such a manner as not to form part of the path traversed by the major portion of the gas on its flow through said casing.

16. An acoustic silencer for sound entrained flowing gases of an internal combustion engine comprising a casing provided with an inlet port and an outlet port for said gases, a plurality of tubes in said casing, at least one of which is arranged off-center with respect to said casing and another of which forms at least a part of the path between said inlet and outlet ports, and means defining a sound attenuating chamber acoustically coupled to said first-mentioned tube.

17. An acoustic silencer for sound entrained gases of an internal combustion engine comprising a casing provided with an inlet port and an outlet port for said gases, a tube disposed within said casing, and sound attenuating chamber means acoustically coupled to said tube in such a manner so as not to form a part of the path traversed by the major portion of said gases on their way from said inlet to said outlet ports, the axis of said tube being disposed to one side of said chamber means.

18. An acoustic sound attenuating device for use in connection with the intake or exhaust of an internal combustion engine for silencing noise associated therewith and comprising a casing having a gas inlet port and a gas outlet port, a transverse partition cooperating with said casing to define at least in part a sound trap chamber substantially closed on all sides and disposed within the confines of said casing, an opening acoustically coupling directly the interior of said casing and said chamber, and a tube connected to said opening, the axis of said tube being offset from the axis of said chamber, the cross-sectional area of said chamber being appreciably greater than the cross-sectional area of said opening, said sound trap chamber being so disposed and arranged that little or none of the gas passes through said chamber on its way from said inlet to said outlet ports.

19. An acoustic silencer for use in connection with the intake or exhaust of an internal combustion engine for silencing noise associated therewith and comprising a casing having a gas inlet port and a gas outlet port, means including a transverse partition within said casing and cooperating therewith to provide an acoustic chamber for attenuating said noise, a tube arranged within said casing and the axis of which tube is arranged to one side of the center of said casing, said tube having an inlet opening, operatively connected to said inlet port, and two outlet openings, one of said outlet openings constituting a gas outlet opening in communication with said outlet port, the other of said outlets constituting a sound energy outlet in communication with said acoustic chamber, said chamber being constructed and arranged in such a way as not to form part of the path traversed by a major portion of the gas on its flow through the silencer and being constructed adjacent said communication in such a way as to restrict the return flow of sound energy from said chamber to said tube.

20. A silencer for use in connection with the intake or exhaust of an internal combustion engine for silencing noise associated therewith and comprising a body, a header at one end thereof provided with a gas inlet opening, a header at the other end thereof, means providing a gas outlet opening, a partition within said body cooperating with at least one of said headers and with said body to form an acoustic sound attenuating side-branch chamber, and a tube of small cross-sectional area compared to the cross-sectional area of said chamber disposed within said body and opening into said chamber only at one side of the axis of said body, said tube forming at least part of the gas conducting channel between said inlet and outlet openings, said chamber being constructed and arranged in such a manner as not to form a part of the path traversed by the major portion of the gas in its flow through said silencer.

21. In a muffling unit through which the exhaust gas stream flows on its way to atmosphere and having provisions for connection to the exhaust pipe of an engine and to a tail pipe leading to atmosphere, said muffling unit having in combination a passageway through which the gas stream flows through said unit and including an expansion chamber, an outlet from said unit leading to atmosphere through said tail pipe, means providing an enlarged dead chamber separate from said passageway and having a communication therewith, said dead chamber being abruptly enlarged adjacent said communication and having a cross-sectional area substantially greater than that of said communication and being adapted to permit the rapid expansion of sound energy within said dead chamber after passing through said communication, said communication being restricted to the return flow of sound energy from said chamber to said passageway so as to trap the major portion of the sound energy within said dead chamber, said unit including a tube in line with said communication having a series of relatively small openings extending circumferentially and axially thereof and disposed between said dead chamber and the outlet from said unit, said tube being arranged at an axis offset from the central major axis of said casing.

22. An acoustic sound attenuating device for use in connection with the intake or exhaust of an internal combustion engine for silencing noise associated therewith and comprising a casing having a gas inlet port and a gas outlet port, a plurality of tubes arranged within said casing and forming at least part of the gas path between said inlet and said outlet, means providing a sound trap chamber substantially closed on all sides and disposed within the confines of said casing, openings acoustically coupling directly the interior of said tubes and said chamber, the cross-sectional area of said chamber being appreciably greater than the cross-sectional area of any one of said openings, said sound trap chamber being so disposed and arranged that little or none of the gas passes through said chamber on its way from said inlet to said outlet ports.

23. An acoustic sound attenuating device for use in connection with the intake or exhaust of an internal combustion engine for silencing noise associated therewith and comprising a casing having a gas inlet port and a gas outlet port, a pair of tubes arranged in said casing and forming part of a path for the flow of gas between said ports, each of said tubes being open at one end, means providing a sound trap chamber substantially closed on all sides and disposed within the confines of said casing, said chamber having spaced openings acoustically coupling directly the interior of said chamber and said gas path, at least one of said openings communicating directly with the interior of one of said tubes, the cross-sectional area of said chamber being appreciably greater than the cross-sectional area of at least one of said openings, said sound trap chamber being so disposed and arranged that it does not form part of the path traversed by the major portion of the gas on its flow through said casing.

24. An acoustic silencer for use in connection with the intake or exhaust of an internal combustion engine for silencing noise associated therewith and comprising a casing, a header at each end thereof, a transverse partition within said casing and located between said headers, said partition and one of said headers forming an acoustic sound attenuating chamber, a plurality of tubes eccentrically disposed within said casing, each of said tubes being acoustically coupled to said chamber.

25. An acoustic silencer for sound entrained flowing gases of an internal combustion engine comprising a casing provided with an inlet port and an outlet port, a plurality of parallel non-concentric tubes disposed within said casing and forming at least part of the path traversed by said gases from said inlet to said outlet port, said tubes being provided with openings and sound attenuating chamber means acoustically coupled to said tubes by means of said openings.

26. An acoustic silencer for sound entrained flowing gases of an internal combustion engine comprising a casing provided with an inlet port and an outlet port, a plurality of parallel tubes disposed within said casing and forming at least a part of the path traversed by said gases from said inlet to said outlet ports, said tubes being arranged so as to divide said flowing gases into a plurality of parallel streams flowing in the same direction, said tubes being provided with openings and sound attenuating chamber defining means acoustically coupled to said tubes by means of said openings.

27. An acoustic silencer having means providing a sound attenuating acoustic chamber disposed across one end thereof, means including a plurality of parallel tubes affording a path for the flow of sound entrained gases through said silencer, each of said tubes being open at one end, said chamber having an opening in a wall thereof forming an acoustic coupling by means of which said chamber is acoustically coupled to said path, said chamber being abruptly enlarged adjacent said acoustic coupling.

28. A silencer for use in connection with the intake or exhaust of an internal combustion engine for silencing noise associated therewith and comprising a body, a header at one end thereof provided with a gas inlet port, a header at the other end thereof, means providing a gas outlet port, a partition within said body and cooperating therewith and with at least one of said headers to form an acoustic sound attenuating side-branch chamber, and a plurality of tubes of relatively small cross-sectional area compared to the cross-sectional area of said chamber disposed within said body, each of said tubes being open at one end, at least one of said tubes being acoustically coupled to said chamber and another of said tubes forming at least part of the gas conducting channel between said inlet and outlet ports, said chamber being constructed and arranged in such a manner so that little or none of the gas passes through said chamber in its flow through said silencer.

29. A silencer for use in connection with the intake or exhaust of an internal combustion engine for silencing noise associated therewith and comprising a body, a header at one end thereof provided with a gas inlet port, a header at the other end thereof, means providing a gas outlet port, a partition within said body and cooperating therewith and with at least one of said headers to form an acoustic sound attenuating side-branch chamber, and a plurality of tubes of relatively small cross-sectional area compared to the cross-sectional area of said chamber disposed within said body, each of said tubes being open at one end, at least one of said tubes being acoustically coupled to said chamber and another of said tubes forming at least a part of the gas conducting channel between said inlet and outlet ports, said chamber being constructed and arranged in such a manner as not to form part of the path traversed by the major portion of the gas in its flow through said silencer, at least one of said tubes having a series of relatively small openings formed in the walls thereof.

30. A silencer for sound entrained flowing gases comprising a casing having an inlet port and an outlet port, a plurality of parallel tubes within said casing through which said gases flow on their path between said ports and arranged to divide and conduct the gases in parallel unidirectional streams, partition means cooperating with one end of said casing to form an acoustic sound attenuating chamber, and an opening in a wall of said chamber providing an acoustic coupling between said chamber and the path through which said gases flow through said casing.

31. A silencer for sound entrained flowing gases comprising a casing having an inlet port and an outlet port, a plurality of parallel tubes within said casing through which said gases flow on their path between said ports and arranged to divide and conduct the gases in parallel unidirectional streams, and sound attenuating chamber defining means acoustically coupled to said parallel flow tubes.

32. An acoustic silencer having means providing a sound attenuating acoustic chamber disposed across one end thereof, means including a plurality of parallel tubes affording a path for the flow of gases through said silencer, each of said tubes having a pair of ends, one end of each pair being nearer to said inlet port than the other end of such pair, the nearer ends of two of said tubes constituting gas inlets therefor, the gas flow in said two tubes being in the same direction, said chamber having a restricted opening in a wall thereof forming an acoustic coupling by means of which said chamber is acoustically coupled to said path, said chamber being abruptly enlarged adjacent said acoustic coupling.

33. An acoustic silencer for sound entrained flowing gases having inlet and outlet ports for said gases, spaced partitions extending transversely of said silencer, means including a plurality of parallel tubes supported by said partitions, each of said tubes being open at one end and affording a path for the flow of gases through said silencer, means providing a sound attenuating acoustic chamber disposed across one end of said silencer, said chamber having a restricted opening in a wall thereof forming an acoustic coupling by means of which said chamber is acoustically coupled to said path, said chamber being abruptly enlarged adjacent said acoustic coupling.

34. An acoustic silencer for sound entrained flowing gases comprising a casing having inlet and outlet ports, spaced partitions extending transversely of said casing, means including a plurality of tubes arranged in parallel relationship, said tubes being supported by said partitions within said casing, each of said tubes being open at one end and forming at least part of a passageway through which gas flows between said ports, one of said partitions cooperating with a part of said casing to provide a sound attenuating acoustic chamber disposed across one end thereof, one wall of said chamber having means providing restricted open communication with said passageway forming an acoustic coupling by means of which said chamber is acoustically coupled to said passageway, said chamber being abruptly enlarged adjacent said acoustic coupling.

35. An acoustic silencer for sound entrained flowing gases having inlet and outlet ports, means providing a sound attenuating acoustic chamber disposed across one end thereof, means including parallel tubes affording a path for the flow of sound entrained gases through said silencer, said chamber having wall openings forming acoustic couplings by means of which said chamber is acoustically coupled to said path, said chamber being abruptly enlarged adjacent said acoustic couplings.

36. An acoustic silencer for sound entrained gases of an internal combustion engine, said silencer comprising a casing provided with an inlet port and an outlet port for said gases, a plurality of open ended tubes disposed within said casing, at least part of said tubes forming a path traversed by gas flowing from said inlet to said outlet ports, and sound-attenuating chamber means acoustically coupled to said tubes by means of said open ends.

37. An acoustic silencer for sound entrained flowing gases comprising a casing, a header at each end thereof, a transverse partition within said casing and located between said headers, said partition and one of said headers forming at least part of an acoustic sound attenuating chamber, a tube eccentrically disposed within said casing and forming at least part of a gas passageway through said casing, and means defining an opening into said chamber from said passageway and formed at least in part by said tube.

38. An acoustic sound attenuating device for use in connection with the intake or exhaust of an internal combustion engine for silencing noise associated therewith and comprising a casing having gas inlet and outlet ports, a transverse partition cooperating with said casing to define at least in part a sound trap chamber substantially closed on all sides and disposed within the confines of said casing, means defining an opening acoustically coupling directly the interior of said casing and said chamber, and a tube arranged in said opening and forming at least a part of a gas passageway within said casing and between said ports, the axis of said tube being disposed at one side of said chamber, the cross sectional area of said chamber being appreciably greater than the cross sectional area of said opening, said sound trap chamber being abruptly enlarged adjacent said opening and disposed and arranged so that little or none of the gas passes through said chamber on its way from said inlet to said outlet ports.

39. An acoustic silencer having a sound channel and provided at one end thereof with means defining a substantially closed sound attenuating acoustic chamber, tubular means mounted in and protruding from at least one side of a wall of said chamber and opening abruptly into said chamber, said tubular means being disposed eccentrically with respect to the longitudinal axis of said silencer and forming an acoustic coupling from said channel to said chamber.

40. An acoustic silencer for silencing the noise entrained in flowing gases of the intake or exhaust system of an internal combustion engine such as is used in motor vehicles, said noise comprising a conglomeration of pitches, said silencer comprising a casing having an inlet port and an outlet port, transverse tube carrying partition means in said casing forming a pair of chambers, one of said chambers constituting a sound attenuating acoustic chamber, means comprising a plurality of tubes extending longitudinally of said casing for acoustically coupling said chambers in restricted open communication, each of said tubes being open at one end, part of said last named means and part of the other chamber forming a path for gases flowing from said inlet port to said outlet port.

41. An acoustic silencer for silencing the noise entrained in flowing gases of the intake or exhaust system of an internal combustion engine such as is used in motor vehicles, said noise comprising a conglomeration of pitches, said silencer comprising a casing provided with an inlet port and an outlet port for said gases, a partition extending transversely of said casing, and a plurality of tubes disposed within said casing and extending longitudinally thereof, each of said tubes being open at one end, said partition and one end of said casing cooperating to define a sound attenuating acoustic chamber acoustically coupled to said tubes, said tubes forming at least part of a path traversed by noises entrained in said gases and defining open acoustic coupling means for said chamber, said chamber being abruptly enlarged adjacent said acoustic coupling means.

42. An acoustic silencer comprising a casing, a header at each end thereof, a transverse partition within said casing and located between said headers, said partition and one of said headers forming an acoustic sound attenuating chamber, a plurality of tubes eccentrically disposed within said casing, each of said tubes having an end opening into said chamber, said chamber being abruptly enlarged adjacent said opening and having a cross section greater than the sum of the cross sections of said tubes.

43. An acoustic silencer for sound entrained flowing gases of internal combustion engines comprising a casing having an inlet port and an outlet port, means defining a main channel through which the gas passes on its way from the inlet to the outlet port, said means including at least in part a plurality of tubes each having an open end, means defining a sound attenuating chamber acoustically coupled to said gas channel, said chamber being so designed that when cut by a plane, at least a part of the wall of said chamber as cut by said plane will have an outline substantially elliptical in form.

44. An acoustic silencer for sound entrained flowing gases of an internal combustion engine comprising a casing having inlet and outlet ports, means defining a main channel through which the gas passes on its way from the inlet to the outlet port, said means including at least in part a plurality of tubes each being open at one end, means defining a sound attenuating chamber acoustically coupled to said gas channel, said chamber being arranged at the outlet end of said silencer and in such a manner that little or none of said gases flow through said chamber.

45. An acoustic silencer for sound entrained flowing gases of an internal combustion engine comprising a casing having inlet and outlet ports, means defining a main channel through which the gas passes on its way from the inlet to the outlet port, said means including at least in part a plurality of tubes each of which is open at one end, means defining a sound attenuating chamber acoustically coupled to said gas channel, said chamber extending across one end of said casing and being arranged so that little or none of said gases pass through said chamber.

CARL F. RAUEN.